H. R. STUART & W. H. THOMPSON.
OZONIZER.
APPLICATION FILED MAY 9, 1911.

1,024,533.

Patented Apr. 30, 1912.
2 SHEETS—SHEET 1.

WITNESSES:
Fred H. Miller
B. B. Hines

INVENTORS.
Harry R. Stuart and
Hillmer H. Thompson
BY Otto S. Schairer
ATTORNEY.

H. R. STUART & W. H. THOMPSON.
OZONIZER.
APPLICATION FILED MAY 9, 1911.

1,024,533.

Patented Apr. 30, 1912.
2 SHEETS—SHEET 2.

WITNESSES:
Fred H. Miller
B. B. Hines

INVENTORS.
Harve R. Stuart and
Hilmer H. Thompson
BY Otto S. Schairer
ATTORNEY.

UNITED STATES PATENT OFFICE.

HARVE R. STUART, OF WILKINSBURG, PENNSYLVANIA, AND WILBUR H. THOMPSON, OF SPRINGFIELD, MASSACHUSETTS, ASSIGNORS, BY DIRECT AND MESNE ASSIGNMENTS, TO WESTINGHOUSE ELECTRIC AND MANUFACTURING COMPANY, A CORPORATION OF PENNSYLVANIA.

OZONIZER.

1,024,533.  Specification of Letters Patent.  Patented Apr. 30, 1912.

Application filed May 9, 1911. Serial No. 626,082.

*To all whom it may concern:*

Be it known that we, HARVE R. STUART and WILBUR H. THOMPSON, citizens of the United States, and residents, respectively, of Wilkinsburg, in the county of Allegheny and State of Pennsylvania, and Springfield, in the county of Hampden and State of Massachusetts, have invented a new and useful Improvement in Ozonizers, of which the following is a specification.

Our invention relates to apparatus for manufacturing ozone from air, and it has for its object to provide an ozonizer which shall be effective in operation and simple and economical in construction, and shall be provided with means whereby an adjustment of the amount of ozone produced may be readily effected.

Figure 1:
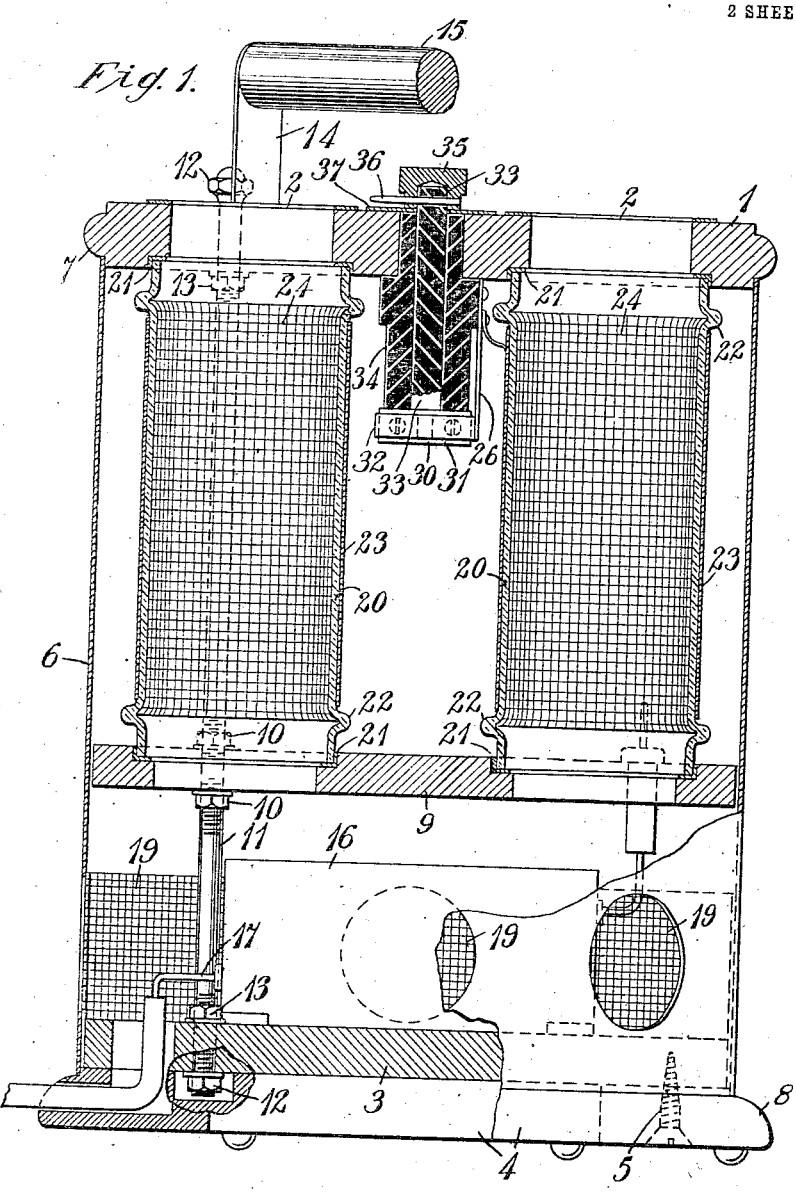
Figure 2:
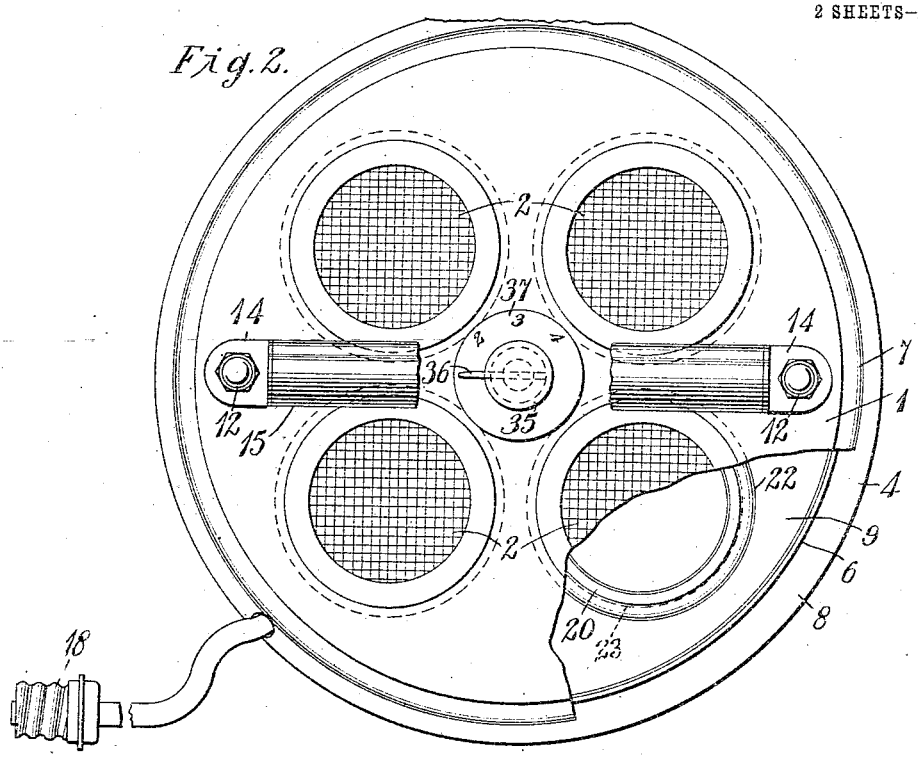
Figure 3:
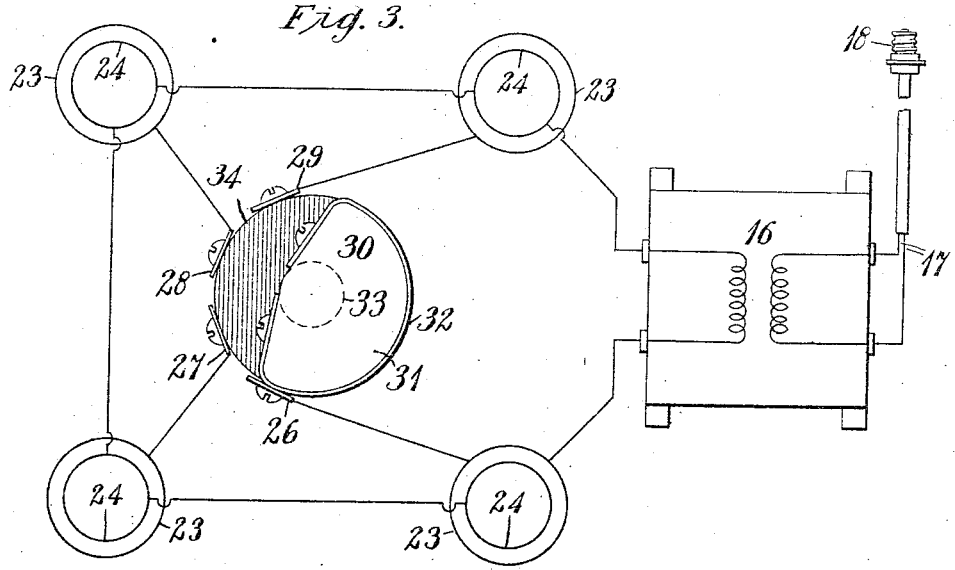

Figure 1 of the accompanying drawings is a view, largely in vertical section but partially in side elevation, of an ozonizer embodying our invention. Fig. 2 is a plan and sectional view of the ozonizer of Fig. 1, and Fig. 3 is a diagrammatic view illustrating the connections of the ozonizer.

The operating parts of the ozonizer are inclosed within a casing comprising a top member 1 having suitably spaced apertures with screens or pieces of netting 2 secured over them, a bottom member comprising two parts 3 and 4 that are secured together by means of screws 5, and a cylindrical sheet metal shell 6 extending and supported between a rib or bead 7 upon the edge of the top member 1 and a projecting molding 8 formed integral with the edge of the bottom member 4. The sheet metal shell 6 may be removed for inspection and repair of the inclosed parts by removing only the bottom member 4 and without disturbing the other parts of the device.

Within the casing, and located somewhat nearer its bottom than its top, is a partition 9 having spaced apertures corresponding and opposite to the apertures in the top member 1, the said partition being clamped between, and supported by means of, nuts 10 that are threaded upon intermediate portions of vertical rods 11 which extend through the top and bottom members 1 and 4 and are provided at their ends with nuts 12 and 13, between which the said members are clamped. End supports 14 for a handle 15 are also secured to the upper ends of the rods 11 by being clamped between the nuts 12 and the top member 1. By the above-described arrangement of the parts of the frame and casing, a very simple and rigid construction is provided requiring but the minimum number of pieces.

Mounted upon the bottom member 3 within the chamber provided between the said member and the partition 8, is a transformer 16 having primary leads 17 extending through the bottom members 3 and 4 of the casing and connected to a plug 18 or other terminal device that is adapted to be screwed into an ordinary lamp socket (not shown) or to be otherwise suitably connected to a source of alternating current. The shell 6 is provided with apertures opening into the chamber between the bottom member 3 and the partition 9, and these openings are preferably covered by pieces of screen or other meshed material 19, the said apertures providing inlet openings for air which is drawn into the said chamber by the connection currents set up by the heat produced by the transformer and condensers during their operation.

The opposing top and bottom faces respectively of the partitions 9 and the top member 1 are provided, adjacent to the edges of the apertures therein, with shallow recesses which form seats for the ends of glass or other suitable tubular or cylindrical insulators 20 constituting parts of condensers. Small pieces of felt 21, or other suitable cushioning material, are preferably interposed between the ends of the insulating tubes and the members 1 and 9. The insulating tubes are provided near their ends with external lateral flanges or bosses 22 with corresponding internal recesses or depressions, and they are surrounded between the bosses by pieces of tin foil 23, or other suitable sheet metal, which constitute plates or terminals of the condensers. The flanges 22 serve to prevent longitudinal displacement of the plates 23, and also to increase the insulation between them and the inner plates. The other plates or terminals of the condensers are located within the insulating tubes and are preferably composed of aluminum or other non-corrosive mesh or screening 24 of tubular form, having their ends bent outwardly into the recesses opposite the bosses or flanges 22, for the purpose of securing them in position. As thus constructed, the condensers constitute draft tubes or flues through which air that is taken into the lower chamber rises and passes to the exterior, and, in so doing, more or less of it passes through and comes in contact with the aluminum mesh, so that some of the oxygen contained therein may be converted into ozone by the action of the silent electrical discharges between the condenser plates. As the inner plates of the condensers are composed of aluminum and a free circulation of air is provided in proximity to the said plates, no nitrogen or nitrous or other deleterious fumes are given off with the ozone.

The inner plates or terminals of the condensers are all connected to one of the secondary terminals of the transformer 16, and the outer plate of one of them is connected to the other secondary terminal of the transformer. The latter condenser is, therefore, always included in the secondary circuit. The outer plates of the condensers are also respectively connected to stationary resilient fingers 26, 27, 28 and 29 of a switch 30 that comprises, further, a non-conducting rotatable cylindrical member 31, a part of the circumferential surface of which is covered by a conducting band 32. The rotatable member has a shank 33 that extends upwardly through a supporting bushing 34 that is secured to and depends from the top member 1 and upon which fingers 26 to 29, inclusive, are mounted. A knob or head 35 is secured to the upper end of the shank 33 to provide convenient means for actuating the movable member of the switch, and an index or pointer 36 that projects from the side of the knob and moves over a scale plate 37 indicates the position of the switch and the number of active condensers. It will be understood that, by rotating the movable switch member, the conducting band 32 may be caused to successively engage the resilient fingers and, thus, the condensers rendered successively active. An adjustment of the amount of ozone produced may be thereby effected.

In order to operate the ozonizer, it is only necessary to connect it to any suitable source of alternating current, such as an ordinary lighting circuit, by screwing the plug 18 into a lamp socket. The switch may then be moved so as to obtain the desired amount of ozone.

It will, of course, be understood that the transformer 16 may, if desired, be replaced by any other suitable device, such as an induction coil and interrupter, for producing fluctuating or alternating currents of high voltage, without departing from the spirit of the invention, the term "transformer," as here used, being intended to include all such devices.

We claim as our invention:

1. A condenser for ozonizers and the like comprising an insulating tube having lateral bosses adjacent to its ends, a conducting member supported by the tube between the bosses, and another member adjacent to the opposite face of the tube.

2. A condenser for ozonizers and the like comprising an insulating tube having lateral bosses and recesses adjacent to its ends, a conducting member supported by the tube between the bosses, and another member adjacent to the opposite face of the tube and secured in the recesses therein.

3. A condenser for ozonizers and the like comprising an insulating tube having lateral bosses and recesses adjacent to its ends, a conducting member supported by the tube between the bosses, and a tubular conducting mesh adjacent to the opposite face of the tube and secured in the recesses therein.

4. An ozonizer comprising a transformer, a plurality of condensers each having one terminal connected to one secondary terminal of the transformer and one of them having its remaining terminal connected to the other secondary terminal of the transformer, and means for successively connecting the remaining terminals of the condensers to the said other secondary terminal of the transformer.

5. An ozonizer comprising a casing having top and bottom members and a partition, the top member and the partition having apertures, and a tubular condenser disposed between the partition and the top member and having its ends registering with the apertures therein.

6. An ozonizer comprising a casing having top and bottom members and a partition, the top member and the partition having apertures, and a tubular condenser disposed between the partition and the top member and having its ends registering with the apertures therein, and a source of fluctuating electromotive force located between the partition and the bottom member and connected to the condenser.

7. A condenser for ozonizers and the like comprising an insulating tube having one or more integral side projections, a conducting member supported by the tube and its projection or projections, and another conducting member supported adjacent to the opposite face of the tube.

8. A condenser for ozonizers and the like comprising an insulating tube having one or more integral side projections and corresponding recesses, a conducting member having a coöperative engagement with said projection or projections and another conducting member having a coöperative engagement with said recess or recesses.

In testimony whereof, I have hereunto subscribed my name this 6th day of May, 1911.

HARVE R. STUART.

Witnesses to the signature of Harve R. Stuart:
OTTO S. SCHAIRER,
B. B. HINES.

In testimony whereof, I have hereunto subscribed my name this 8th day of May, 1911.

WILBUR H. THOMPSON.

Witnesses to the signature of Wilbur H. Thompson:
EARLE E. HIGGINS,
EDWARD KRONVALL.